E. R. SEWARD.
GAGE.
APPLICATION FILED MAR. 19, 1907.
919,477.
Patented Apr. 27, 1909.
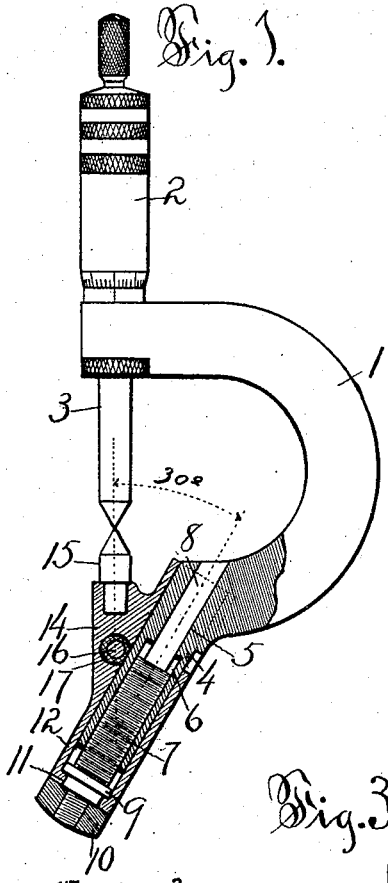
Fig. 1.
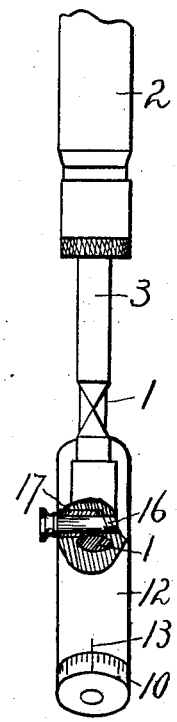
Fig. 2.
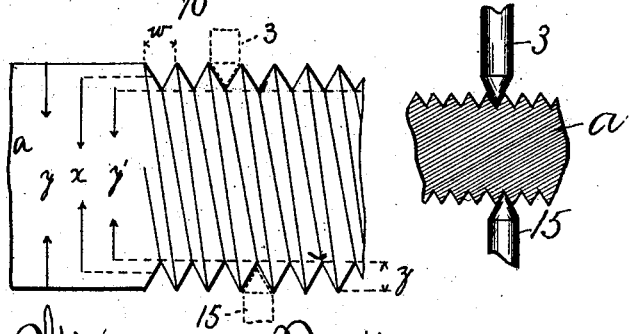
Fig. 3.
Fig. 4.
Witnesses
L. E. Berkovitch
D. Freimann
Inventor.
Ernest R. Seward,
by Arthur B. Jenkins,
Attorney.

UNITED STATES PATENT OFFICE.

ERNEST R. SEWARD, OF HARTFORD, CONNECTICUT.

GAGE.

No. 919,477.  Specification of Letters Patent.  Patented April 27, 1909.

Application filed March 19, 1907. Serial No. 363,171.

*To all whom it may concern:*

Be it known that I, ERNEST R. SEWARD, a citizen of the United States, and a resident of Hartford, in the county of Hartford and State of Connecticut, have invented a new and Improved Gage, of which the following is a specification.

My invention relates more especially to the class of machinists' tools employed for determining the pitch diameter of screw threads, and the object of my invention is to provide a device of this class by means of which the pitch diameter of screws of widely varying sizes may be instantly determined, the exact measure being shown by the gage.

A device in the use of which these objects may be attained is illustrated in the accompanying drawings, in which—

Figure 1 is a view in side elevation of a tool embodying my invention, with parts cut in section to show construction. Fig. 2 is a view in elevation of the device in a plane at right-angles to the plane of Fig. 1, with parts broken away to show the construction, arrangement and method of operation of the means for holding the anvil-carrier upon the extension of the frame that supports it, the latter being but slightly exposed in this view. Fig. 3 is a detail view showing the application of the device. Fig. 4 is an elevation of a large screw illustrating the principle involved in the use of my invention.

In the accompanying drawings the numeral 1 denotes a frame or body part having at one end a thimble 2 for operating the micrometer screw 3. This thimble and its connection with the screw 3 are of ordinary and well-known construction, and further and detailed description is therefore deemed unnecessary herein, it being sufficient to state that the connection is such that the degree of rotary movement of the thimble 2 imparts to the screw a much less degree of longitudinal movement.

The frame 1 is generally of the usual C shape common to devices of this class. That end of the frame opposite the thimble 2 is formed into an extension or neck 4, preferably of tubular form and having a central opening 5. This extension is located with its axis at an angle to the axis of the screw 3. The opening in the extension 4 is enlarged as at 6 and has its inner surface screw threaded for the reception of an anvil feed screw 7. This feed screw has a shank 8 extending into the opening 5 and is threaded to fit the thread in the opening or chamber 6. A flange 9 is formed on this feed screw and a head 10 is secured thereto as by means of inter-engaging screw threaded parts. This provides an annular groove extending about the feed screw within which a lip 11 from an anvil sleeve 12 extends. The head 10 is graduated, as shown in Fig. 2 of the drawings, these graduations operating in connection with an index point 13 on the sleeve 12. This sleeve bears an anvil rest 14 in which an anvil 15 is located. A clamp screw 16 supported in the sleeve 12 and extending transversely across the parts may be employed for holding the sleeve 12 in any position of adjustment.

By my improved gage I have provided means whereby the anvil may be set in a position determined by the "pitch" of the screw, and the micrometer screw then being set in position to allow the screw to be measured to pass through between the ends of the anvil and the micrometer screw, the reading of the latter will give the exact pitch diameter of the screw, and the gage may be employed to measure the pitch diameters of screws varying greatly in size.

In the form shown herein for holding the sleeve the screw 16 is loosely fitted within a sleeve 17, the end of which abuts against the neck 4, as shown in Fig. 2 of the drawings.

The tips of the micrometer screw and of the anvil have their opposite sides arranged at practically the same angle each to the other as the angle of the two sides of the groove in a thread to be measured, so that said screw and tip take their bearing for practically the full depth of the thread. In fact, the ends of the tips are relieved slightly so that they shall not seat at the bottom of the groove, owing to the fact that the bottom of the groove for its full extent, or the bottom of the grooves on different screws, are not liable to be uniform.

In order to better illustrate the principle involved in using my invention I refer to Fig. 4 which shows a screw *a* the pitch diameter of which, indicated by *x*, it is desired, it will be assumed, to ascertain. This dimension, as is well known, equals the external diameter, $y$, less twice one-half the depth, $z$, of the thread, or, expressed as an equation, $$x = y - 2\left(\frac{z}{2}\right)$$

which reduced is $X = y - z$. It is well nigh the universal practice in making screws with V-threads to have the adjacent faces form an angle of 60°, this being followed whether the thread be fine or coarse, and whether cut upon a large or small cylinder; and from this it follows that the depth of the thread of such a screw is always proportionate to its linear pitch, without reference to the size of the cylinder upon which the thread is cut, so that in a screw of a certain pitch the depth, $z$, of its thread is always the same.

In using the gage herein described the parts are set as represented in Fig. 1, that is, with the points or ends of the parts 3 and 15 in line with each other and in engagement—actual or theoretical. If it were practically possible to make the points of the parts 3 and 15 theoretically correct at their extreme ends, and if it were also the common practice to make the bottoms of the threads likewise theoretically perfect, then it would not matter what were the shape of the parts 3 and 15 so long as their points or ends might engage with the bottoms of the threads. But since this theoretical accuracy is impractical I have found it desirable to so shape the ends of the parts 3 and 15 that they will properly seat themselves in the grooves between adjacent threads, when the gage is correctly applied to a screw. The best form to give the ends of the contact parts of the gage to secure this result, though not the only form by any means, is that illustrated in the drawings. Here they are shown as of conical shape with sides sloping 30°, and these cones may be slightly truncated, as already stated, so that any imperfection in the finishing of the bottoms of the threads will not interfere with the accurate working of the instrument. Another advantage incident to the conical shape of the points of the parts 3 and 15 is that the latter may be adjusted relative to the former without interfering therewith, the point of the part 15 moving past the other part with their side faces in engagement.

To ascertain the pitch diameter of the screw $a$, the number of threads to the inch is first ascertained; and then, by reference to a table prepared for that purpose, the anvil is adjusted to the proper position for measuring a screw of that pitch. When this adjustment has been made it will be found that the point, theoretical or actual, of the part 15, will have been carried laterally a distance equal to the distance, $w$, between threads, and at the same time will have been carried inward a distance equal to the depth of the thread, $z$. The anvil or part 15 having been set, the micrometer stem 3 is adjusted to fit the screw, as indicated in dotted lines in Fig. 4, when the reading of its scale will be the true pitch diameter of the screw $a$. The diametric distance separating the points of the parts 3 and 15, indicated in Fig. 4 by $y'$, is not the pitch diameter, nor is it the distance indicated by the micrometer gage, when the parts are adjusted as represented in the drawings. What the micrometer gage does indicate is the distance, $y'$, plus the depth of the screw thread, $z$, the anvil point having been moved inward beyond the point of the part 3 the latter distance before any adjustment of this part 3 was begun. By reference to Fig. 4 it will be seen that $y' + z = y - z$, or $x$ in either case, $x$ indicating the pitch diameter.

What I claim as my invention and desire to secure by Letters Patent is:—

1. A frame, a micrometer screw having a pointed end mounted in one end of the frame, an anvil having a contact end that is adapted to be brought opposite to and in axial alinement with the micrometer screw, a carrier for the anvil, and a guide on the frame for directing the movements of said carrier arranged to maintain the axis of the anvil parallel with that of the micrometer, and to cause the anvil to move bodily with its contact end traveling along a line inclined to the axis of the micrometer screw.

2. A C-shaped frame, a micrometer screw having a pointed end adapted to engage a threaded member and mounted in one end of the frame, an extension at the opposite end of the frame fixed in a position inclined to the axis of the micrometer screw, an anvil-carrier mounted upon and movable along the said extension, and an anvil adapted to engage with the screw thread supported by the said carrier.

3. A base, a micrometer screw mounted in the base, an anvil mounted in the base and having a pointed end, a screw threaded into the base and located at an angle inclined to the axis of the micrometer screw, and connections between said anvil and screw for moving the former.

4. A base, a micrometer screw mounted in the base, an anvil sleeve mounted in the base and movable in a plane inclined at an angle to the axis of the micrometer screw and to the axis of the screw the thread of which is to be measured, and a screw threaded into the base and in engagement with said sleeve.

5. In a micrometer gage for measuring screws, a frame, a micrometer screw mounted therein, an anvil movable bodily in the frame and having a contact end to engage a screw threaded member, and means for locating the contact end of the anvil in different positions along a line parallel with a side of a thread of the screw to be measured when the gage and screw are in proper relation for taking a measurement.

6. In a micrometer gage for measuring screws, a frame, a micrometer screw mounted in the frame, an anvil mounted in the frame and arranged to move in planes parallel with a face of the thread of the screw to be measured when the screw is properly applied to the gage, and means for moving and setting the anvil.

7. In a micrometer gage for measuring screws, a frame, a micrometer screw having a contact end shaped to be seated in a groove between screw threads, a movable anvil opposite the micrometer screw also shaped to be seated in the groove between the threads, and means for accurately setting the anvil, in different positions along a line parallel with a side face of the thread to which the gage may be properly applied.

ERNEST R. SEWARD.

Witnesses:
 EDWIN C. DICKENSON,
 ARTHUR B. JENKINS.